May 14, 1929.  W. J. PEARMAIN  1,712,676
CLUTCH
Filed June 30, 1927   2 Sheets-Sheet 1
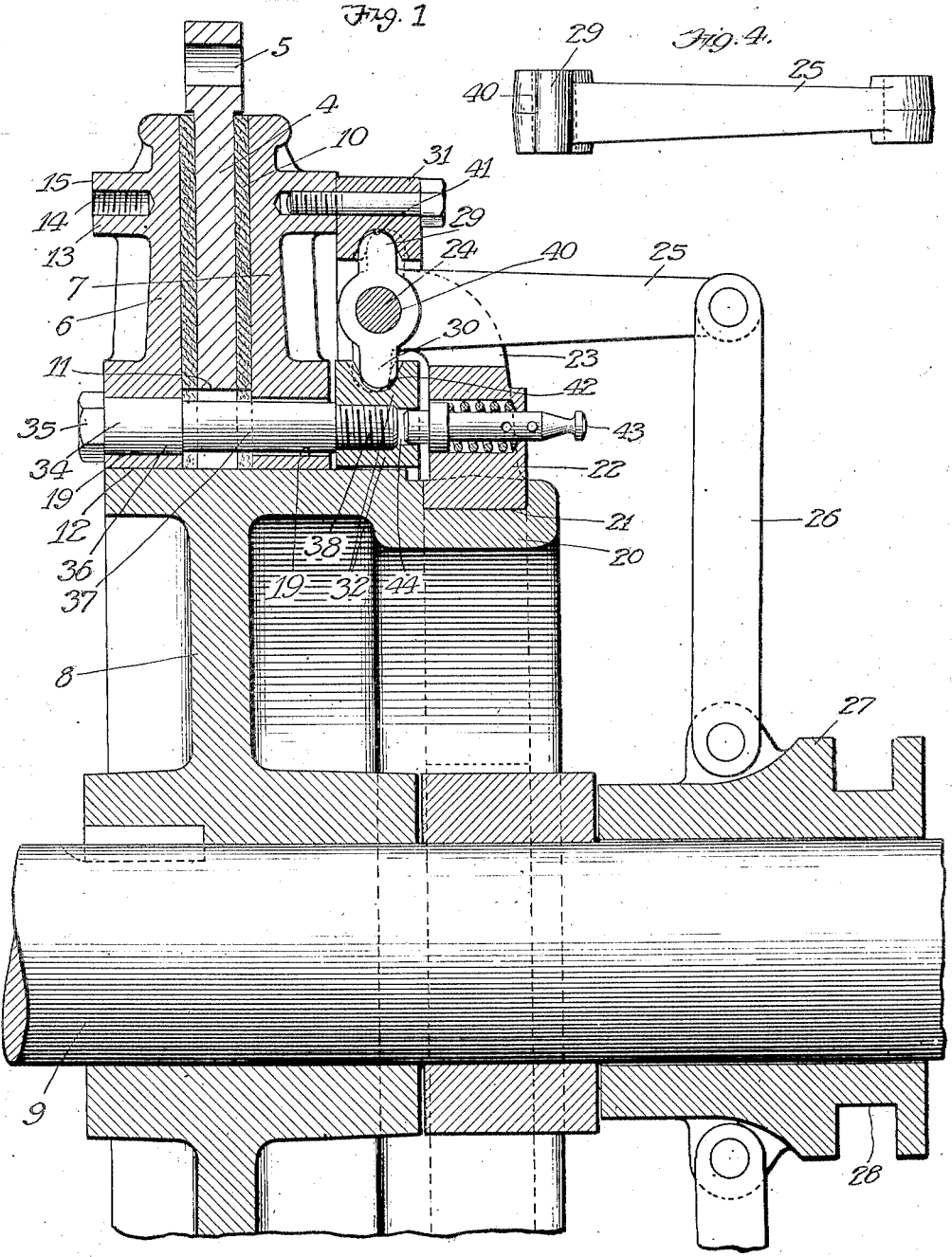
Witness
Martin H. Olsen.
Inventor
William J. Pearmain
By Rector Hibben Davis &Macauley
Attys

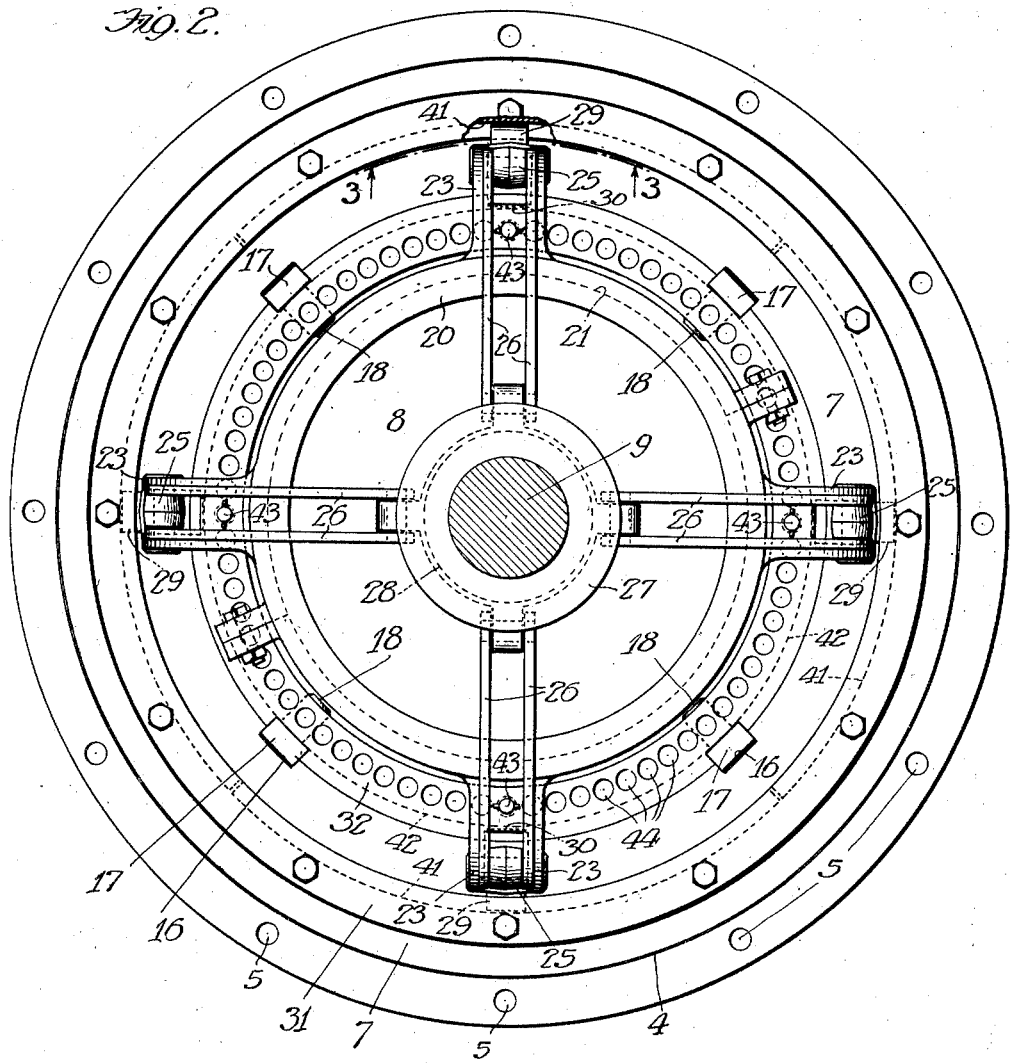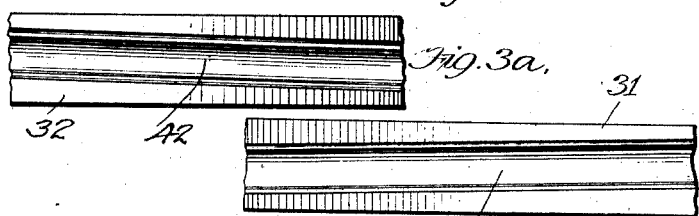

Patented May 14, 1929.

1,712,676

UNITED STATES PATENT OFFICE.

WILLIAM J. PEARMAIN, OF RACINE, WISCONSIN, ASSIGNOR TO TWIN DISC CLUTCH COMPANY, OF RACINE, WISCONSIN, A CORPORATION OF WISCONSIN.

CLUTCH.

Application filed June 30, 1927. Serial No. 202,502.

My invention relates to that type of clutch in which an intermediate friction disc is attached to one of the concentric rotary members between which the clutch forms a driving connection and clamping discs keyed to the other of said members for rotation therewith, engage the friction disc on opposite sides. It is the object of the present invention to provide a clutch of this character in which the clamping discs are positively operated toward and from the intermediate friction disc and in which provision is made for ready and convenient adjustment of the means for actuating the clamping discs toward and from the friction disc, for the purpose of taking up wear, etc. Other features and advantages of my improved construction will appear from the following detailed description and the drawings of a preferred form thereof, and from the following claims. It is to be understood, however, that the specific disclosure is for the purpose of exemplification only, and that the scope of the invention is defined in the claims.

In the drawings accompanying and forming a part of this specification, Figure 1 is an axial section through a preferred form of clutch embodying my invention, parts being shown in elevation:

Fig. 2 is a face view thereof, the shaft constituting the driven member being shown in section;

Fig. 3 is a fragmentary section on the curved line 3—3 of Fig. 2;

Fig. 3ᵃ is a similar view on the same line looking in the opposite direction.

Fig. 4 is an elevation of a detail.

Each part is identified by the same reference character wherever it occurs in the several views.

In the typical construction shown the friction disc 4 is provided with holes 5 for attachment to the flywheel of an engine or other similar driving member, and the clamping discs 6, 7 are keyed to a hub 8 fixed to shaft 9 which, in this instance, is the driven member.

The friction disc is provided with the usual facings 10 of friction material and formed with a central opening 11 of greater diameter than the hub 8, to avoid interference with the members for actuating one of the clamping discs which members will be hereinafter described.

The clamping discs 6, 7, are conveniently made identical so that but one set of such discs need be kept in stock for each size clutch. Each disc has a central opening 12 of a size to slide smoothly upon the hub 8 and is provided at suitable intervals and at a proper distance from the central opening with bosses 13, tapped at 14, for the reception of bolts, and planed at 15 to form seats for the member hereinafter described. Each clamping disc is also formed in its inner periphery with rectangular transverse keyways 16 for the reception of similarly shaped keys on the hub 8. In the typical construction four of these keyways are shown. The keys 17 which form the driving connection between the hub and the clamping discs, are short rectangular bars extending axially of the hub on the periphery thereof, and of a sufficient length to efficiently engage both of the clamping discs and permit the necessary axial movement of the latter without disengagement. The said driving keys may be secured to the hub by dowels 18, here shown in dotted lines in Fig. 2 and which may be two in number for each key.

The clamping discs are also formed adjacent their inner periphery with holes 19, preferably uniformly spaced about the center of said discs for a purpose which will presently appear.

The means for simultaneously causing the clamping discs to enage and be disengaged from the friction disc will now be described. The rim of the hub 8 is extended at 20 and formed with an annular channel 21, which receives a fulcrum ring 22. The ring may be divided and the sections bolted together in a well-known manner in order to apply it to the channel in which it fits snugly but with sufficient freedom to permit the angular adjustment to which reference will later be made. At suitable intervals about its periphery the ring 22 is formed or provided with pairs of lugs 23 which at their outer ends, are curved toward the clutch discs and perforated to receive pivot pins 24. In the construction shown there are four of these pairs of lugs. An actuating lever 25 is fulcrumed upon each pin 24, there being four of these levers, and the long arms of said levers are connected by pairs of links 26 to an actuating sleeve 27 which is free to slide upon the shaft 9. The sleeve is formed with a circumferential groove 28 for the reception of the ring of the usual clutch operating mechanism. Each of the levers 25, which are identical in construction, is formed with a cross-head comprising an outer arm 29 and an inner arm 30, which engage seats or sockets formed respectively in the inner periphery of ring 31 and in the outer periphery of ring 32. Ring 31 is bolted to the bosses 13 on the near clamping plate and is concentric with the latter. Ring 32 fits and slides upon the outer periphery of the hub 8, previously described, and is connected by actuating bolts 34 to the far clamping disc 6. In the construction shown there are four of these actuating bolts, and each comprises a head 35, a portion of larger diameter 36 adjacent the head and where the bolt fits in the opening 19 of the far disc and a portion 37 of slightly smaller diameter which extends through the hole 19 in the near clamping disc. The bolt is tapped into ring 32 at 38.

It will now be evident that when the shifting sleeve 27 is thrown inwardly and the levers 25 thrown outward by the links 26, the engagement of the inner and outer arms of the levers with the respective rings, causes the clamping discs to move toward and engage the intermediate friction disc and when the levers 25 are drawn inwardly the clamping discs are moved away from the friction disc.

To provide for adjustment to take up wear, etc., and as best shown in Figs. 1, 2 and 4, the end surfaces of the arms 29, 30 are cylindrical on axes slightly inclined in opposite directions respectively as shown in full and dotted lines in said figures. The sockets 41 in the outer ring 31, which receive respectively the outer arms of the levers, are in the nature of grooves substantially semi-cylindrical in cross-section and of a diameter to fit the corresponding ends of the levers, inclined like a screw thread, the inclination also corresponding to the inclination of the semi-cylindrical ends of the lever and each extending a distance along the internal periphery of the ring sufficient to provide for the adjustment hereinafter described. This distance, where there are four levers as in the typical clutch here described, many approximate a quarter of a circumference. The sockets 42 on the inner ring are of similar shape, inclination and extent, but the inclination is in the opposite direction to correspond to the inclination of the cylindrical ends of the inner arms of the levers which seat in said sockets. As above indicated, the fulcrum ring 22 carrying the levers, is angularly adjustable in the channel 21 and it is provided with a spring locking pin 43 which may engage any one of a series of pin holes 44 in the ring 32. In Fig. 1, for convenience of illustration, one of these holes 44 is shown concentric with the opening in the ring which receives the actuating bolts but this is incidental. The series of pin holes 44 is shown as extending throughout the circumference of ring 32, but manifestly it will be sufficient if the series correspond, substantially, in length with the socket grooves 41, which, in the specific form of clutch shown is, as previously stated, approximately equal in extent to a quarter of a circumference.

Obviously, by adjusting the ring 22 carrying the levers, and consequently adjusting the position at which the arms of the levers engage the socket grooves in the rings 31, 32, the engagement of the clamping disks with the intermediate friction disk may be regulated.

When the clutch is first assembled, the ring 32 is adjusted so that the lever ends 29, 30 occupy positions toward the right hand end of the respective sockets 41, 42, as said sockets are shown in Figs. 3 and 3ᵃ. As the clutch wears during use and it becomes necessary therefore that the plates 6, 7 more closely approach the disk 4 in order to maintain the grip of the clutch, the ring 22 is angularly adjusted to carry the levers to the left (as seen in Figs. 3 and 3ᵃ) where, by reason of the inclination of the sockets the closing movement of said levers causes the plates 6, 7 to more closely approach the friction disk 4.

I claim:

1. In a clutch of the class described, and in combination with the friction and clamping disks thereof, a hub to which said clamping disks are keyed to rotate therewith and permit axial movement of said clamping disks relative thereto, a fulcrum ring on one side of said disks, angularly adjustable with respect to said hub, means for locking said ring against movement with respect to said hub, levers fulcrumed on said ring, means for swinging said levers, means on the clamping disk adjacent said levers having sockets engaged by arms of said levers, a second ring, surrounding said hub on the same side of said disk as the first mentioned ring and having axial movement on said hub and sockets with which other arms of said levers engage, and connections between the last mentioned ring and the clamping disk on the other side of the clutch.

2. In a clutch of the class described, and in combination with the friction and clamping disks thereof, a hub to which said clamping disks are keyed to rotate therewith and permit axial movement of said clamping disks relative thereto, a fulcrum ring on one side of said clutch, levers fulcrumed on said ring, means for swinging said levers, means on the clamping disk adjacent said levers having sockets engaged by arms of said levers, a second ring surrounding said hub on the same side of the clutch as the first mentioned ring and having axial movement on said hub and sockets with which other arms of said levers engage, and connections between the last mentioned ring and the clamping disk on the other side of the clutch.

3. In a clutch of the class described, and in combination with the friction and clamping disks thereof, a hub to which said clamping disks are keyed to rotate therewith and permit axial movement of said clamping disks relative thereto, a fulcrum ring on one side of said clutch, levers fulcrumed on said ring, means for swinging said levers, means on the clamping disk adjacent said levers having sockets engaged by the arms of said levers, a second ring surrounding said hub on the same side of the clutch as the first mentioned ring and having axial movement on said hub and sockets with which other arms of said levers engage, and bolts connecting the last mentioned ring and the clamping disk on the other side of the clutch.

4. In a clutch of the class described, and in combination with the friction and clamping disks thereof, a hub to which said clamping disks are keyed to rotate therewith and permit axial movement of said clamping disks relative thereto, a fulcrum ring on one side of said clutch, levers fulcrumed on said ring, means for swinging said levers, a ring on the clamping disk adjacent said levers having sockets engaged by arms of said levers, a ring surrounding said hub on the same side of the clutch and having axial movement on said hub and sockets with which other arms of said levers engage, and connections between the last mentioned ring and the clamping disk on the other side of the clutch.

5. In a clutch of the class described, and in combination with the friction and clamping disks thereof, a hub to which said clamping disks are keyed to rotate therewith and permit axial movement of said clamping disks relative thereto, a fulcrum ring on one side of said clutch, levers fulcrumed on said ring and having inner and outer arms, means for swinging said levers, means connected to the adjacent clamping disk having a series of sockets for the outer arms of the respective levers, means axially movable on the hub having sockets engaged by the respective inner arms of said levers and connections from the last said means to the clamping disk remote from said levers.

6. In a clutch of the class described, and in combination with the friction and clamping disks thereof, a hub to which said clamping disks are keyed to rotate therewith and permit axial movement of said clamping disks relative thereto, means carried by one of said clamping disks having sockets therein, means connected to the other of said clamping disks having sockets therein, the sockets of one of said means being inclined circumferentially of the clutch, and levers having inner and outer arm, the outer arms engaging respectively the sockets of the first said means and the inner arms engaging the sockets of the second said means, and means for swinging said levers.

7. In a clutch of the class described, and in combination with the friction and clamping disks thereof, a hub to which said clamping disks are keyed to rotate therewith, and permit axial movement of said clamping disks relative thereto, a fulcrum ring on one side of said clutch, angularly adjustable with respect to said hub, means for locking said ring against movement with respect to said hub, levers fulcrumed on said ring and comprising inner and outer arms, means for swinging said levers, means carried by one of said clamping disks having sockets therein, and means connected to the other of said clamping disks having sockets therein, the sockets of one of said means being inclined circumferentially of the clutch.

8. In a clutch of the class described, and in combination with the friction and clamping disks thereof, a hub to which said clamping disks are keyed to rotate therewith and permit axial movement of said clamping disks relative thereto, a fulcrum ring on one side of said clutch, angularly adjustable with respect to said hub, means for locking said ring against movement with respect to said hub, levers comprising inner and outer arms fulcrumed on said ring, means for swinging said levers, means carried by one of said clamping disks having sockets therein, and means connected to the other of said clamping disks having sockets therein, the sockets of one of said means being inclined circumferentially of the clutch in one direction and the sockets of the other of said means being inclined circumferentially of the clutch in the other direction, the first mentioned sockets being engaged by the outer arms of said levers and the sockets of the second mentioned means being engaged by the inner arms of said levers.

9. In a clutch of the class described, and in combination with the friction and clamping disks thereof, a hub to which said clamping disks are keyed to rotate therewith and permit axial movement of said clamping disks relative thereto, a fulcrum ring on said hub angularly adjustable with relation thereto, means for locking said ring against rotation with respect to said hub, levers pivoted on said ring, a ring upon the clamping member adjacent said fulcrum ring having sockets engaged by the outer arms of said levers, and a ring axially movable on the hub and connected to the other of said clamping disks and formed with sockets on its outer periphery engaged by the inner arms of said levers, the sockets on one of said rings being inclined circumferentially thereof.

10. In a clutch of the class described, and in combination with the friction and clamping disks thereof, a hub to which said clamping disks are keyed to rotate therewith and permit axial movement of said clamping disks relative thereto, a fulcrum ring mounted on said hub and having angular adjustment relative thereto, means for locking said ring in adjusted position, levers fulcrumed on said ring and having inner and outer arms, means for swinging said levers, a concentric ring mounted on the clamping disk adjacent said levers and having in its inner periphery a series of sockets, engaged respectively by the outer arms of said levers, and a second ring axially movable on said hub, connected to the other of said clamping disks and formed with sockets engaged by the inner arms of said levers respectively, said sockets being inclined circumferentially of the respective rings, the inclination of the sockets in one of said rings being the reverse of that of the sockets in the other of said rings.

In testimony whereof, I have subscribed my name.

WILLIAM J. PEARMAIN.